United States Patent
Tanner et al.

(10) Patent No.: US 6,767,607 B2
(45) Date of Patent: Jul. 27, 2004

(54) MULTIWELL PLATE HAVING TRANSPARENT WELL BOTTOMS

(75) Inventors: Allison J. Tanner, Portsmouth, NH (US); Gregory R. Martin, Acton, MA (US); Hongming Wang, Lee, NH (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/925,638

(22) Filed: Aug. 9, 2001

(65) Prior Publication Data

US 2003/0031829 A1 Feb. 13, 2003

(51) Int. Cl.[7] .............................. B32B 3/10; B01L 3/00; B01L 3/02; C12M 1/34
(52) U.S. Cl. ........................ 428/131; 422/99; 422/100; 435/288.3; 435/288.4
(58) Field of Search ........................... 428/131; 422/99, 422/101; 435/288.3, 288.4

(56) References Cited

U.S. PATENT DOCUMENTS

| | | | | |
|---|---|---|---|---|
| 4,076,550 A | * | 2/1978 | Thurn et al. | 106/490 |
| 4,284,542 A | * | 8/1981 | Boyce et al. | 524/140 |
| 4,871,590 A | * | 10/1989 | Merz et al. | 427/387 |
| 5,302,515 A | * | 4/1994 | Goodwin, Jr. | 435/29 |
| 5,858,770 A | * | 1/1999 | Perlman | 435/305.3 |
| 6,171,780 B1 | * | 1/2001 | Pham et al. | 435/4 |
| 6,458,275 B1 | * | 10/2002 | Shukla et al. | 210/321.6 |

* cited by examiner

Primary Examiner—Harold Pyon
Assistant Examiner—Patricia L. Nordmeyer
(74) Attorney, Agent, or Firm—William J. Tucker

(57) ABSTRACT

A multiwell plate is described that is used for assaying samples and is made from a plastic upper plate which forms the sidewalls of one or more wells and a glass lower plate which forms the bottom walls of the wells. The plastic upper plate and glass lower plate are attached and bound to one another by an enhanced adhesive. The enhanced adhesive includes an adhesive mixed with an additive that interacts with the adhesive, the plastic upper plate and the glass bottom plate in a manner that strengthens a bond between the plastic upper plate and the glass lower plate. Also described herein is a method for making such multiwell plates.

21 Claims, 3 Drawing Sheets

MULTIWELL PLATE HAVING TRANSPARENT WELL BOTTOMS

BACKGROUND OF THE INVENTION

1. Field of the Invention

The present invention relates in general to the biotechnology field and, in particular, to a multiwell plate made from a plastic upper plate and a glass bottom plate that are joined to one another using an enhanced adhesive.

2. Description of Related Art

The recent growth in many areas of biotechnology has increased the demand to perform a variety of studies, commonly referred to as assays, of biochemical systems. These assays include for example, biochemical reaction kinetics, DNA melting point determinations, DNA spectral shifts, DNA and protein concentration measurements, excitation/emission of fluorescent probes, enzyme activities, enzyme co-factor assays, homogeneous assays, drug metabolite assays, drug concentration assays, dispensing confirmation, volume confirmation, solvent concentration, and solvation concentration. Also, there are a number of assays which use intact living cells that require visual examination.

Assays of biochemical systems are carried out on a large scale in both industry and academia, so it is desirable to have an apparatus that allows these assays to be performed in a convenient and inexpensive fashion. Because they are relatively easy to handle, are low in cost, and generally disposable after a single use, multiwell plates are often used for such studies. Multiwell plates are typically formed from a polymeric material and consist of an ordered array of individual wells. Each well includes sidewalls and a bottom so that an aliquot of sample can be placed within each well. The wells may be arranged in a matrix of mutually perpendicular rows and columns. Common sizes for multiwell plates include matrices having dimensions of 8×12 (96 wells), 16×24 (384 wells), and 32×48 (1536 wells).

The materials used to construct a multiwell plate are selected based on the samples to be assayed and the analytical techniques to be used. For example, the materials of which the multiwell plate is made should be chemically inert to the components of the sample or any biological or chemical coating that has been applied to the multiwell plate. Further, the materials should be impervious to radiation or heating conditions to which the multiwell plate is exposed during the course of an experiment and should possess a sufficient rigidity for the application at hand.

In many applications, a transparent window in the bottom of each well is needed. Transparent bottoms are primarily used in assay techniques that rely on emission of light from a sample within the well and subsequent spectroscopic measurements. Examples of such techniques include liquid scintillation counting and techniques which measure light emitted by luminescent labels, such as bioluminescent or chemiluminescent labels, fluorescent labels, or absorbance labels. Optically transparent bottom wells also enable microscopic viewing of specimens and living cells within the well. Currently, optically transparent and ultraviolet transparent bottomed multiwell plates exist in the market and are used for the aforementioned purposes. These multiwell plates are typically made from a hybrid of different polymeric materials, one material making up the sidewalls of the wells and another material making up the bottom walls of the wells.

Preferably, multiwell plates that are used for spectroscopic and microscopic measurements would have well bottoms made from glass. Glass has the advantage of being chemically inert, has superior optical properties in the visible range, is rigid, and is highly resistant to any deformation process caused by heating, due to its high melting temperature. Further and unlike most polymers, glass can be formulated and processed to provide a surface which produces very little background signal (barring absorbance) and which may be manufactured to extreme smoothness. While it is simple to make glass in sheets, it is not possible to injection mold articles made from glass, and it is extremely difficult to press a molten gob of glass into an industry standard multiwell plate format. A solution to the problem, is to join a plastic upper plate that forms the sidewalls of the wells of a microplate to a substantially flat transparent glass lower plate that forms the bottom walls of the wells. One commonly employed method of joining a plastic upper plate and a glass lower plate to one another is to use an adhesive. Unfortunately, the multiwell plate that uses a traditional adhesive to bond together the plastic upper plate and glass lower plate does not perform well under normal cell culture conditions. In particular, the adhesive bond that holds together the plastic upper plate and glass lower plate is known to degrade such that the two plates can easily separate or the contents in one well can leak into other wells. Accordingly, there is a need for a multiwell plate that has a strong adhesive bond between the plastic upper plate and the glass lower plate. This need and other needs are satisfied by the multiwell plate and the method of the present invention.

BRIEF DESCRIPTION OF THE INVENTION

The present invention includes a multiwell plate that is used for assaying samples and is made from a plastic upper plate which forms the sidewalls of one or more wells and a glass lower plate which forms the bottom walls of the wells. The plastic upper plate and glass lower plate are attached and bound to one another by an enhanced adhesive. The enhanced adhesive includes an adhesive mixed with an additive that interacts with the adhesive, the plastic upper plate and the glass bottom plate in a manner that strengthens a bond between the plastic upper plate and the glass lower plate. The present invention also includes a method for making such multiwell plates.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
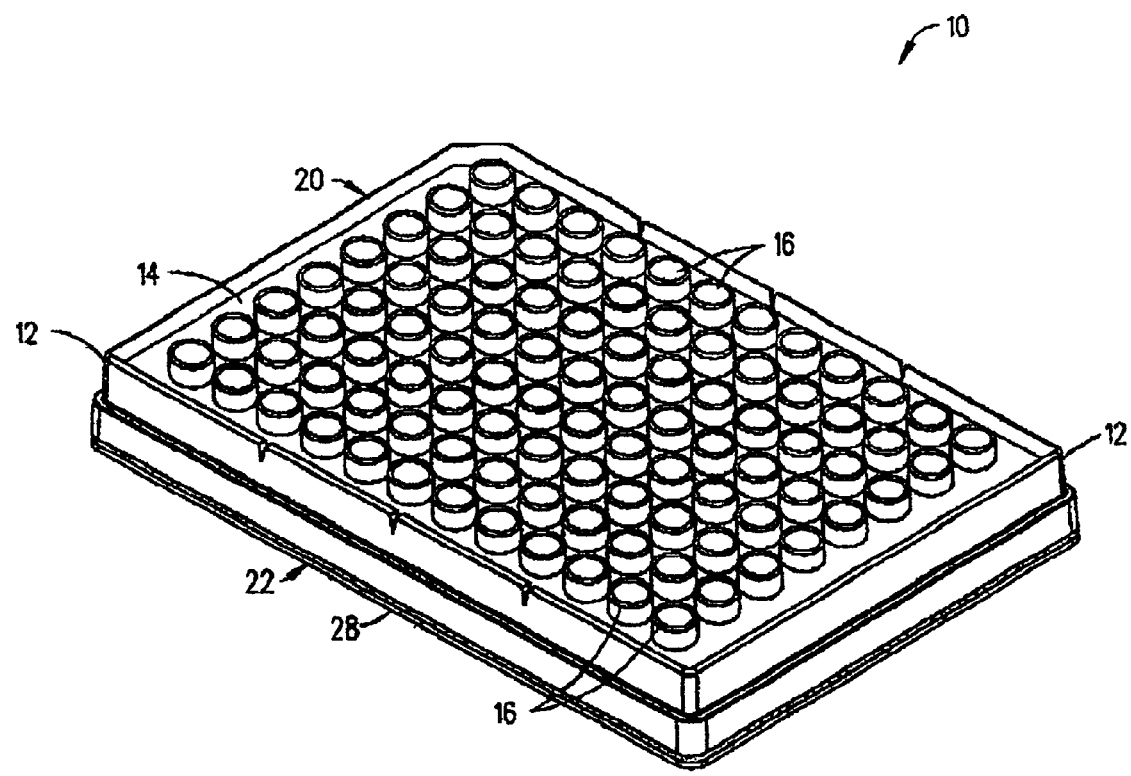
FIG. 1 is a perspective view of a multiwell plate in accordance with the present invention.

Referring to FIG. 1, there is illustrated a perspective view of an exemplary multiwell plate 10 of the present invention. The multiwell plate 10 (e.g., microplate) includes a peripheral skirt 12 and a top surface 14 having an array of wells 16 each of which is capable of receiving an aliquot of sample to be assayed. Preferably, the multiwell plate 10 conforms to industry standards for multiwell plates; that is to say, the multiwell plate 10 is bordered by a peripheral skirt 12, laid out with ninety-six wells 16 in an 8×12 matrix (mutually perpendicular 8 and 12 well rows). In addition, the height, length, and width of the multiwell plate 10 preferably conform to industry standards. However, the present invention can be implemented in a multiwell plate that has any number of wells and is not limited to any specific dimensions and configurations.

Figure 2:
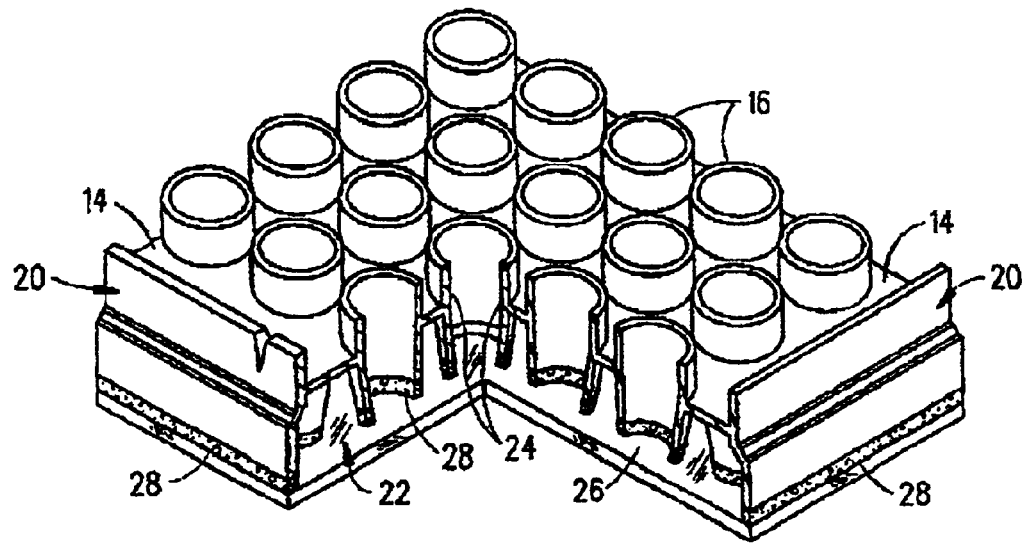
FIG. 2 is a cut-away partial perspective view of the multiwell plate shown in FIG. 1.
Figure 3:
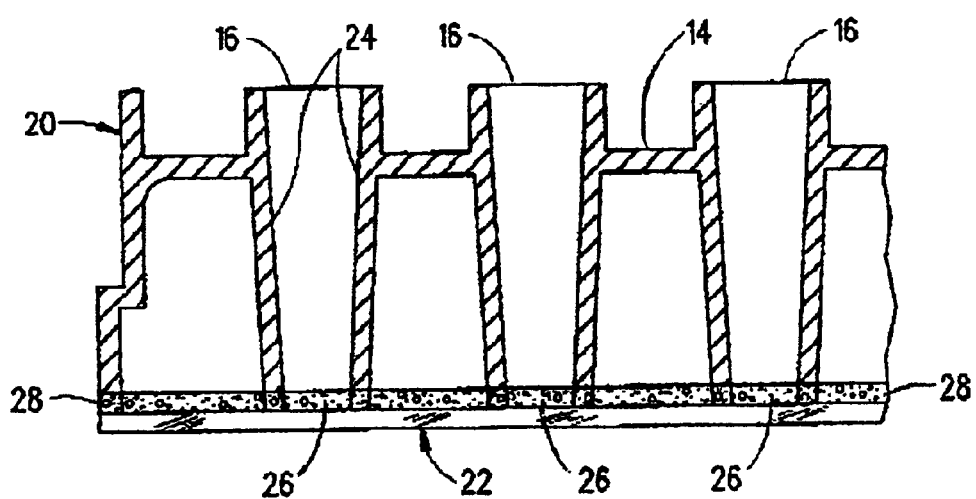
FIG. 3 is a cross-sectional side view of the multiwell plate shown in FIG. 1.

Referring to FIGS. 2 and 3, there are illustrated two cross sectional views of the multiwell plate 10 shown in FIG. 1. The multiwell plate 10 is of two-part construction including an upper plate 20 and a lower plate 22. The upper plate 20 forms the peripheral skirt 12, the top surface 14 and the sidewalls 24 of the wells 16. The lower plate 22 forms the bottom walls 26 of the wells 16. During the manufacturing process, the upper plate 20 and lower plate 22 are joined together at an interface by an enhanced adhesive 28. For clarity, a more detailed discussion about the manufacturing process and the enhanced adhesive 28 is provided below after a brief discussion about the exemplary structures of the multiwell plate 10.

The upper plate 20 includes a frame that forms the sidewalls 24 of an array of open-ended sample wells 16 in addition to the peripheral skirt 12, and the top surface 14. The upper plate 20 is preferably molded from a polymeric material (e.g., polystyrene) that becomes intertwined upon heating and bonds together in a non-covalent mechanism upon cooling, thereby forming an interpenetrating polymer network. Further, the upper plate 20 need not be molded, instead the upper plate 20 can be laminated so that each layer has desired properties. For example, a top most layer may be anti-reflective, a middle layer may form the sidewalls of the wells and can be hydrophobic for meniscus control, and the bottommost layer may be a polymeric material.

The lower plate 22 is preferably made from a layer of glass material that can be purchased from a variety of manufacturers (e.g. Erie Scientific, Corning, Inc.) as a sheet. This sheet can then be altered to fit the dimensions of the desired size multiwell plate 10. The glass material forms a transparent bottom wall 26 for each sample well 16 and permits viewing therethrough. The transparent lower plate 22 also allows for light emissions to be measured through the bottom walls 26 of the wells 16. As shown, the lower plate 22 is substantially flat and is sized to form the bottom walls 26 for all of the wells 16 of the upper plate 20. It should be noted that one or more chemically active coatings (not shown) can be added to a top surface of the bottom walls 26 of the wells 16.

Although the lower plate 22 as a whole is substantially flat, it may have relief features formed upon its surface such as ridges, curves, lens, raised sections, diffraction gratings, dimples, concentric circles, depressed regions, etc. Such features may be located on the lower plate 22 such that they shape or otherwise become features of the bottom walls 26 themselves, and may in turn enhance the performance of an assay, enhance or enable detection (as in the case with lenses and gratings), or serve to mechanically facilitate bonding with the upper plate 20. These relief features may be formed by any number of known methods including vacuum thermoforming, pressing, or chemical etching, laser machining, abrasive machining, embossing, or precision rolling.

Each well 16 includes sidewalls 24 and a bottom wall 26. To prevent light transmission between adjacent wells 16, the sidewalls 24 are preferably formed from an opaque organic polymeric material or filled with an inorganic $TiO_2$ material. For assaying techniques which require the detection of very small amounts of light, as in liquid scintillation counting, the pigmentation used to render the plastic upper plate 20 opaque is preferably light in color (e.g. white) so as to be highly reflective and non-absorptive to ensure high counting efficiency with respect to radioactive samples. The white coloration is typically achieved with $TiO_2$. However the sidewalls 24 may be optically transparent. In some types of luminescence and fluorescence assays, it is preferred that the sidewalls 24 of the wells 16 be non-reflective and absorptive, in which case the sidewalls 24 are formed from a black pigmented polymer. As is commonly known and practiced, the black coloration of the polymer may be achieved by the addition of a pigment material such as carbon black to the polymer blend at concentrations readily known and practiced in the art.

As described above, the bottom wall 26 of a well 16 is formed from a transparent material. Preferably, the transparent material is an inorganic such as glass, but may be pure silica, mica, or even metallic coated films. More preferably, the glass is of a high optical quality and flatness such as boroaluminosilicate glass (Corning Inc. Code 1737). Optical flatness of the bottom walls 26 of the wells 16 is important particularly when the multiwell plate 10 is used for microscopic viewing of specimens and living cells within the wells 16. This flatness is also important in providing even cell distribution and limiting optical variation. For example, if the bottom wall 26 of a well 16 is domed, the cells will tend to pool in a ring around the outer portion of the bottom 26. Conversely, if the bottom wall 26 of a well 16 is bowed downwards, the cells will pool at the lowest point. Glass microscope slides are typically flat within microns to ensure an even distribution. Preferably, the bottom walls 26 of the wells 16 are formed from a glass sheet having a thickness similar to microscope slide cover slips, which are manufactured to match the optics of a particular microscope lens. Although the bottom walls 26 may be of any thickness, for microscopic viewing it is preferred that the bottom wall 26 thickness is less than or equal to 500 microns and their flatness is in the range of 0–10 microns across the diameter of the outer bottommost surface of an individual well 16.

Moreover, the wells 16 can be any volume or depth, but in accordance with the 96 well industry standard, the wells 16 preferably have a volume of approximately 300 ul and a depth of approximately 12 mm. Spacing between wells 16 is approximately 9 mm between center lines of rows in the x and y directions. The overall height, width, and length dimensions of the multiwell plate 10 are preferably standardized at 14 mm, 85 mm and 128 mm, respectively. Wells 16 can be made in any cross sectional shape (in plan view) including, square sidewalls 24 with flat or round bottoms, conical sidewalls 24 with flat or round bottoms, and combinations thereof.

The preferred process of manufacturing the multiwell plate 10 of the present invention includes employing an enhanced adhesive 28 to join the upper plate 20 and the lower plate 22. The use of the enhanced adhesive 28 to bond together the upper plate 20 and the lower plate 22 of the multiwell plate 10 is a marked improvement over the traditional multiwell plate in that the multiwell plate 10 of the present invention performs well under normal cell culture conditions. In contrast, the traditional multiwell plate does not perform well under normal cell culture conditions because the adhesive bond that holds together the plastic upper plate and glass lower plate is known to degrade such that the two plates can easily separate or the contents in one well can leak into other wells.

In the preferred embodiment, the enhanced adhesive 28 includes a non-cytotoxic adhesive (e.g., NOA-63 manufactured by Norland Products Inc.) mixed with approximately 2.5% or greater volume of an additive such as a silane monomer (e.g., Dow Corning Product Z-6030). The silane monomer polymerizes to form a compatible network with the non-cytotoxic adhesive and also interacts with the plastic upper plate 20 and the glass lower plate 22 to strengthen a bond between the plastic upper plate 20 and the glass lower plate 22. Details on how the silane monomer strengthens the bond between the plastic upper plate 20 and the glass lower plate 22 are provided below after a brief discussion about the various properties of the NOA-63 adhesive and the silane monomer.

The NOA-63 adhesive is a clear, colorless, liquid photopolymer that cures when exposed to ultraviolet light. Below are listed some of the physical properties of the NOA-63 adhesive sold under the brand name of Norland Optical Adhesive 63:

Physical state: Liquid
Boiling point: NA
ph: NA
Percent volatile by volume: <0.1
Freezing point: NAv
Evaporation rate: <<Butyl Acetate
Vapor Density: >1 (Air=1)
Vapor Pressure (mm Hg): <0.1@20° C.
Specific Gravity: 1.2 ($H_2O$=1)
Odor: Slightly sulfurous odor
Odor Threshold (ppm): NAv
Viscosity at 25° C.: 2500 cps
Refractive index of cured polymer: 1.56
Elongation at failure: approx. 6%
Modulus of Elasticity: 240,000 psi
Tensile strength: 5000 psi
Hardness-Shore D: 90

In this application, the NOA-63 adhesive can withstand temperatures of −15° C. to 60° C. and up to 90° C. if the adhesive is spread in a thin film. The NOA-63 adhesive also contains a mercapto-ester and has a slight sulfurous odor. In addition, the NOA-63 adhesive cures well in thick sections and has low shrinkage and a slight resiliency to minimize strain. Typically, the NOA-63 adhesive is cured by ultraviolet light and has a maximum absorption in the range of 350 to 380 nanometers. For instance, the energy required to perform a full cure is approximately 4.5 Joules/$cm^3$ of long wavelength ultraviolet light. Some of the light sources that can be used to cure the NOA-63 adhesive are sunlight, mercury lamps and fluorescent black lights. It should be noted that a variety of adhesives now known or subsequently developed that have similar properties to the NOA-63 adhesive can be used in the present invention.

Referring now to the additive, the silane monomer effectively interacts with the NOA-63 adhesive, the plastic upper plate 20 and the glass lower plate 22 to strengthen the bond between the plastic upper plate 20 and the glass lower plate 22. Below are listed some of the physical properties of the silane monomer sold under the brand name of Dow Corning Z-6030:

Product name: 3-(trimethoxysilyl)propyl methacrylate
Synonyms*: [[3-(methacryloyloxy)propyl] trimethoxysilane]
Molecular formula(s): $H_2C$=$C(CH_3)CO_2(CH_2)_3Si(OCH_3)_3$ or $C_{10}H_{20}O_5Si$
Molecular weight: 248.35
Density: 1.045 g/ml
Assay: 98%
Boiling point: 190/760° C.
Refractive index: 1.4310
Flash point: 92.2° C.
Infrared spectrum: conforms to structure
Explosion limits in air: 0.9%–5.4%
Physical state: liquid
Vapor Pressure: 10 MM 130° C.
Specific Gravity: 1.045 ($H_2O$=1)

* Other synonyms include: dynasylan memo; KBM 503; KH 570; M 8550; methacrylic acid, 3-(trimethoxysilyl)propyl ester; gamma-methacryloxypropyltrimethoxysilane; MOPS-M; NUCA 174; 2-propenoic acid, 2-methyl-, 3-(trimethoxysilyl)propyl ester; silan, (3-hydroxypropyl) trimethoxy-, methacrylate; silicone A-174; 3-(trimethoxysilyl)-1-propanol methacrylate; trimethoxysilyl-3-propylester kyseliny methakrylove (Czech); and Union Carbide A-174.

It should be noted that a variety of additives now known or subsequently developed that have similar properties to the silane monomer can be used in the present invention. Examples of suitable additives include 3-(mercaptopropyl) trimethoxy silane ($C_6H_{16}O_3Si$/A189) and tris 2-(methoxyethoxy)vinyl silane ($C_{11}H_{24}O_6Si$/A172).

As mentioned before, the enhanced adhesive 28 including the additive (e.g., silane monomer) mixed with an adhesive (e.g., NOA-63) strengthens the bond between the plastic upper plate 20 and the glass lower plate 22. In particular, the silane monomer polymerizes and forms a compatible network with the NOA-63 adhesive which increases the bond strength of the enhanced adhesive 28 between the plastic upper plate 20 and the glass lower plate 22. Polymerization of NOA-63 adhesive in this case is stimulated by a photoinitiator after receiving energy from ultraviolet light. The silane monomer becomes incorporated into the growing polymer network. The silane functional groups are then free to form bonds with the silanol groups on the glass lower plate 22 as well as with the plasma treated polymer upper surface 20. Of course, the silane monomer must be reactive enough to polymerize within the NOA-63 adhesive, but not polymerize so rapidly that the silane fuctional groups in the silane monomer become unavailable for interacting with the silanol groups on the glass lower plate 22. As such, since there is increased interaction between the enhanced adhesive 28 and the glass lower plate 22, the bond between the glass lower plate 22 and the plastic upper plate 20 is more effective than a bond without the silane monomer.

Pyrolysis at 350° C. for 3 hours, of the glass lower plate 22 cleans the surface of bound contaminants freeing silanol groups for interaction with the enhanced adhesive. Cleansing the glass of contaminants also facilitates adhesion of cells in culture. As for the plastic upper plate 20, the plastic can be polystyrene which has been treated with a plasma to create reactive groups that interact with the silane monomer as it polymerizes in a way similar to the manner in which the silane monomer binds to the reactive (silanol) groups on the glass lower plate 22. It should be noted that the silane monomer increases the strength of the bond between the plastic upper plate 20 and the glass lower plate 22 without affecting the non-cytotoxic status of the adhesive.

A series of tests have been performed in which it was determined that the multiwell plate 10 built using the enhanced adhesive performs well under normal cell culture conditions. Whereas, the same tests showed that the traditional multiwell plate built using the adhesive (e.g., NOA-63 adhesive) alone did not perform well under normal cell culture conditions. To conduct the test, cells were seeded in the wells within an aqueous nutrient solution (media) supplemented with animal serum (usually fetal bovine). The multiwell plates are then incubated at 37° C./85% relative humidity/5% carbon dioxide for at least 3 days. The fluid in the wells is aspirated off and a dye solution is then added to only the middle column of wells. Thereafter, the multiwell plates are incubated at room temperature for 5 minutes and then the dye solution is removed. If leaking occurs, the dye can be detected in wells other than those in which the dye was placed. A second test requires turning the multiwell plates over so that the glass is now the upper portion of the multiwell plates. A rounded object is then used to push up through the well under the glass to see if the bond between the glass lower plates and the plastic upper plates releases or if the round object pushes through the glass in that well. The multiwell plates 10 assembled with the silane monomer mixed with the NOA-63 adhesive passed these tests. In contrast, the traditional multiwell plates assembled using only the NOA-63 adhesive failed these tests.

In addition, a number of tests have been conducted to assess different characteristics between the traditional multiwell plate and multiwell plate 10. For instance, autofluorescence has been examined at 350, 450 and 550 nm and there was very little difference in autofluorescence property between the traditional multiwell plate and multiwell plate 10.

Figure 4:
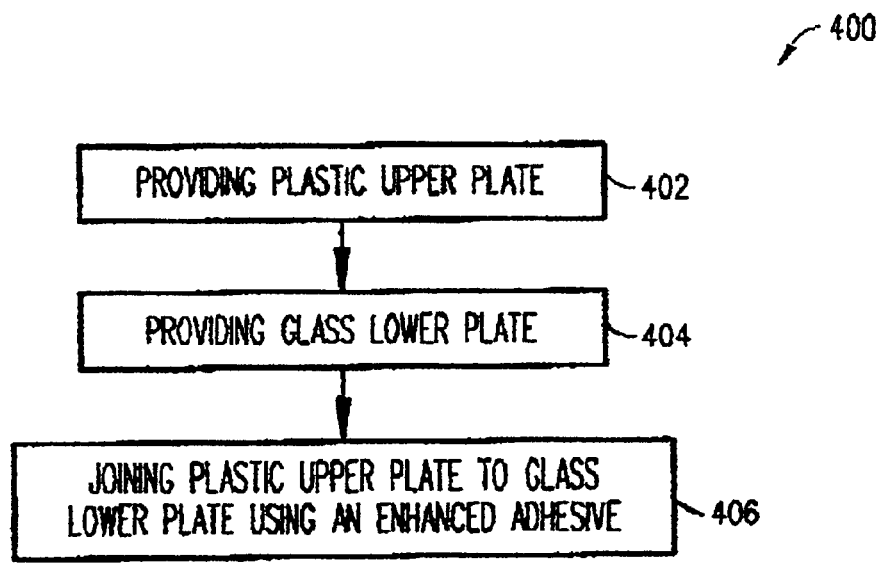
FIG. 4 is a flowchart illustrating the steps of a preferred method for making the multiwell in accordance with the present invention.

Referring to FIG. 4, there is a flowchart illustrating the steps of the preferred method 400 for making the multiwell plate 100. Although the multiwell plate 10 is described herein as having ninety-six functional wells arranged in a grid having a plurality of rows and columns, again it should be understood that the present invention is not limited to any specific number of wells. Accordingly, the multiwell plate 10 and preferred method 400 should not be construed in such a limited manner.

The multiwell plate 10 can be manufactured by providing (step 402) an upper plate 20 and also providing (step 404) a lower plate 22. The upper plate 20 has a frame that forms the sidewalls 24 of one or more wells 16 and is preferably made from a polymeric material such as polystyrene. And, the lower plate 22 has a layer that forms the bottom walls 26 of the wells 16 and is preferably made from an inorganic material such as glass.

The next step in manufacturing the multiwell plate 10 includes joining (step 406) the upper plate 20 to the lower plate 22 using an enhanced adhesive 28. Again, the enhanced adhesive 28 includes an adhesive mixed with an additive that functions to strengthen a bond between the upper plate 20 and the lower plate 22. In the preferred embodiment, the enhanced adhesive 28 includes the non-cytotoxic NOA-63 adhesive mixed with approximately 2.5% or greater volume of a silane monomer.

As described above, the silane monomer interacts with the NOA-63 adhesive to strengthen the bond between the plastic upper plate 20 and the glass lower plate 22. In particular, the silane monomer polymerizes and forms a compatible network with the NOA-63 adhesive which increases the bond strength of the enhanced adhesive 28 between the plastic upper plate 20 and the glass lower plate 22. Polymerization of NOA-63 adhesive in this case is stimulated by a photo-initiator after receiving energy from ultraviolet light. The silane monomer becomes incorporated into the growing polymer network. The silane functional groups are then free to form bonds with the silanol groups on the glass lower plate 22 as well as with the plasma treated polymer upper surface 20. As such, since there is increased interaction between the enhanced adhesive 28 and the glass lower plate 22, the bond between the glass lower plate 22 and the plastic upper plate 20 is more effective than without the silane monomer. As for the plastic upper plate 20, the plastic can be polystyrene which has been treated with a plasma to create reactive groups that interact with the silane monomer as it polymerizes in a way similar to the manner in which the silane monomer binds to the reactive (silanol) groups on the glass lower plate 22.

Figure 5:
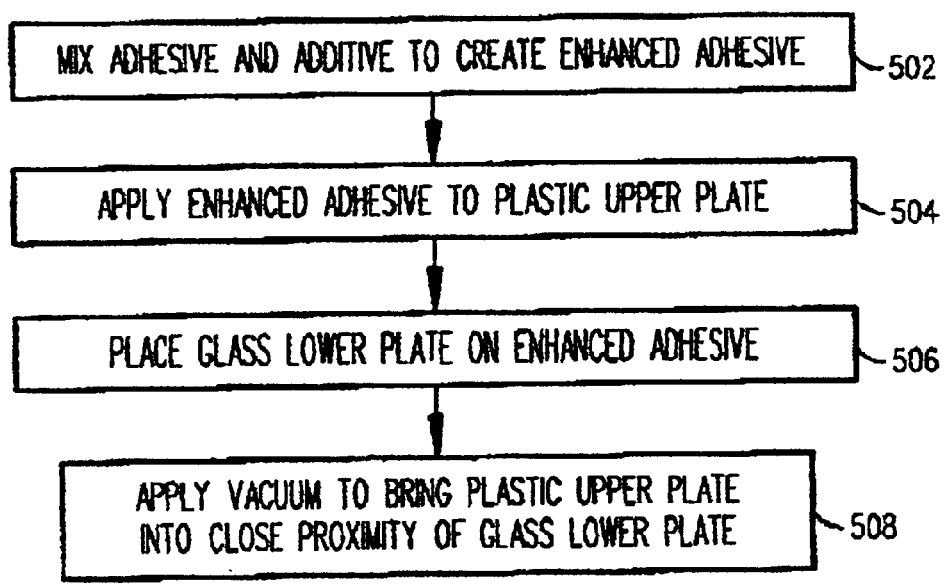
FIG. 5 is a flowchart illustrating in greater detail the joining operation of step 406 of the preferred method 400 shown in FIG. 4.

Referring to FIG. 5, there is a flowchart illustrating in greater detail an exemplary joining operation of step 406 of the preferred method 400. It should be understood that the present invention is not limited to the steps described below that make-up the joining step 406. Instead, it should be understood that there are numerous other ways of joining the upper plate 20 to the lower plate 22 of the multiwell plate 10.

In joining the plastic upper plate 20 to the glass lower plate 22, the proper proportions of the adhesive (e.g., NOA-63 adhesive) and additive (e.g., silane monomer) can be mixed (step 502) in a container before being applied (step 504) to either the plastic upper plate 20 or the glass lower plate 22. Alternatively, the adhesive and additive can be mixed in proper proportions as they are being dispensed just before they are applied (step 504) to the plastic upper plate 20 or the glass lower plate 22. In the preferred embodiment, a Byrd bar is used to apply (step 504) a thin film of the mixed adhesive and additive (enhanced adhesive 28) to a carrier belt that transfers the enhanced adhesive 28 onto the plastic upper plate 20 and then the glass lower plate 22 is placed (step 506) on top of the mixed adhesive and additive. Thereafter, a vacuum is applied (step 508) to bring the plastic upper plate 20 into close proximity of the glass lower plate 22. After exposure to ultraviolet light, the additive polymerizes to form a compatible network with the NOA-63 adhesive and also interacts with the plastic upper plate 20 and the glass lower plate 22 to strengthen a bond between the plastic upper plate 20 and the glass lower plate 22.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A multiwell plate forming a plurality of sample wells for holding samples to be assayed, said multiwell plate comprising:

an upper plate that forms sidewalls of the sample wells, said upper plate made from a polymeric material; and a lower plate that forms bottom walls of the sample wells, said lower plate made from a pyrolized glass, wherein said upper plate was joined to said lower plate by an adhesive mixed with a silane monomer that polymerized to form a compatible network with the adhesive to strengthen a bond between said upper plate and said lower plate, wherein said polymeric material is plasma treated polymeric material after being subjected to a plasma treatment process to create reactive groups that would interact with the silane monomer in said adhesive to further strengthen the bond between said adhesive and said upper plate.

2. The multiwell plate of claim 1, wherein said pyrolized glass was subjected to a pyrolysis process to free silanol groups that would interact with the silane monomer in said adhesive to further strengthen the bond between said adhesive and said lower plate.

3. A multiwell plate forming a plurality of sample wells for holding samples to be assayed, said multiwell plate comprising:
- an upper plate that forms sidewalls of the sample wells, said upper plate made from a plasma treated polymeric material; and
- a lower plate that forms bottom walls of the sample wells, said lower plate made from a pyrolized glass, wherein said upper plate was joined to said lower plate by an adhesive mixed with a silane monomer that polymerized to form a compatible network with the adhesive to strengthen a bond between said upper plate and said lower plate.

4. The multiwell plate of claim 3, wherein said plasma treated polymeric material was subjected to a plasma treatment process to create reactive groups that would interact with the silane monomer in said adhesive to further strengthen the bond between said adhesive and said upper plate.

5. The multiwell plate of claim 3, wherein said pyrolized glass was subjected to a pyrolysis process to free silanol groups that would interact with the silane monomer in said adhesive to further strengthen the bond between said adhesive and said lower plate.

6. A multiwell plate forming a plurality of sample wells for holding samples to be assayed, said multiwell plate comprising:
- an upper plate that forms sidewalls of the sample wells, said upper plate made from a plasma treated polymeric material;
- a lower plate that forms bottom walls of the sample wells, said lower plate made from a pyrolized glass, wherein said upper plate was joined to said lower plate by an adhesive mixed with a silane monomer that polymerized to form a compatible network with the adhesive to strengthen a bond between said upper plate and said lower plate;
- said silane monomer includes silane functional groups that interact with reactive groups associated with said plasma treated polymeric material to strengthen a bond between said adhesive and said upper plate; and
- said silane monomer includes silane functional groups that interact with silane reactive groups associated with said pyrolized glass to strengthen a bond between said adhesive and said lower plate.

7. The multiwell plate of claim 6, wherein said plasma treated polymeric material is polystyrene.

8. The multiwell plate of claim 6, wherein said adhesive mixed with the silane monomer is a non-cytotoxic adhesive.

9. The multiwell plate of claim 6, wherein said silane monomer is 3-(trimethoxysilyl)propyl methacrylate.

10. A multiwell plate having a plurality of sample wells for holding samples to be assayed, said multiwell plate comprising:
- an upper plate that forms sidewalls of the sample wells, said upper plate made from a plasma treated polymeric material; and
- a lower plate that forms bottom walls of the sample wells, said lower plate made from a glass, wherein said upper plate was joined to said lower plate by an adhesive which contained a silane monomer that polymerized within the adhesive to strengthen a bond between said upper plate and said lower plate.

11. The multiwell plate of claim 10, wherein said plasma treated polymeric material was subjected to a plasma treatment process to create reactive groups that would interact with the silane monomer in said adhesive to further strengthen the bond between said adhesive and said upper plate.

12. The multiwell plate of claim 10, wherein said glass is pyrolized glass that was subjected to a pyrolysis process to free silanol groups that would interact with the silane monomer in said adhesive to further strengthen the bond between said adhesive and said lower plate.

13. The multiwell plate of claim 10, wherein said silane monomer is 3-(trimethoxysilyl)propyl methacrylate.

14. The multiwell plate of claim 10, wherein said silane monomer is 3-(mercaptopropyl)trimethoxy silane.

15. The multiwell plate of claim 10, wherein said silane monomer is tris2-(methoxyethoxy)vinyl silane.

16. A multiwell plate for use in assaying samples, comprising:
- a frame that forms sidewalls of at least one well, the frame being formed from a plasma treated polymeric material;
- a layer that forms a bottom wall of the at least one well, the layer being formed from pyrolized glass;
- said frame and said layer are attached and bound to one another by an adhesive mixed with a silane monomer that interacts with the adhesive, said frame and said layer in a manner which strengthens a bond between said frame and said layer;
- wherein said pyrolized glass was subjected to a pyrolysis process to free silanol groups that interact with the silane monomer in said adhesive to further strengthen the bond between said adhesive and said layer; and
- wherein said plasma treated polymeric material was subjected to a plasma treatment process to create reactive groups that interact with the silane monomer in said adhesive to farther strengthen the bond between said adhesive and said frame.

17. The multiwell plate of claim 16, wherein said plasma treated polymeric material is plasma treated polystyrene.

18. The multiwell plate of claim 16, wherein said adhesive is anon-cytotoxic adhesive.

19. The multiwell plate of claim 16, wherein said silane monomer is 3-(trimethoxysilyl)propyl methacrylate.

20. The multiwell plate of claim 1, wherein said silane monomer is 3-(mercaptopropyl)trimethaxy silane.

21. The multiwell plate of claim 16, wherein said silane monomer is tris2-(methoxyethoxy)vinyl silane.

\* \* \* \* \*